Aug. 25, 1925.  1,551,100
J. E. GRAHAM
METHOD AND APPARATUS FOR AUTOMATICALLY SHOWING WHEN TENNIS
NETS AND THE LIKE ARE CORRECTLY ADJUSTED IN POSITION
Filed Jan. 26, 1925  2 Sheets-Sheet 1
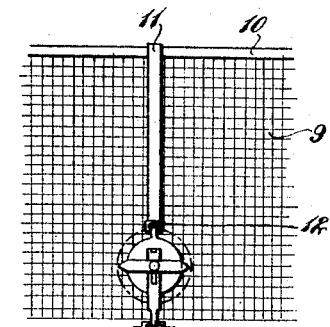
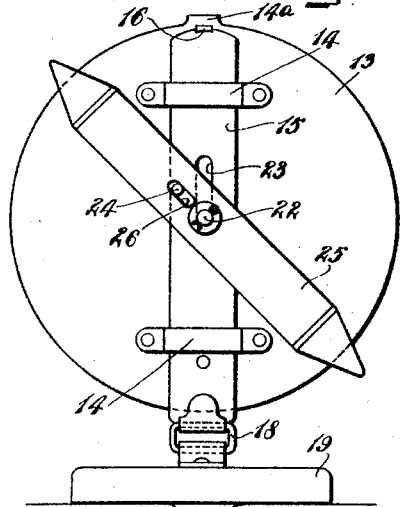

Aug. 25, 1925. 1,551,100
J. E. GRAHAM
METHOD AND APPARATUS FOR AUTOMATICALLY SHOWING WHEN TENNIS
NETS AND THE LIKE ARE CORRECTLY ADJUSTED IN POSITION
Filed Jan. 26, 1925 2 Sheets-Sheet 2

Patented Aug. 25, 1925.

1,551,100

UNITED STATES PATENT OFFICE.

JOHN ELPHINSTONE GRAHAM, OF LONDON, ENGLAND.

METHOD AND APPARATUS FOR AUTOMATICALLY SHOWING WHEN TENNIS NETS AND THE LIKE ARE CORRECTLY ADJUSTED IN POSITION.

Application filed January 26, 1925. Serial No. 4,911.

*To all whom it may concern:*

Be it known that I, JOHN ELPHINSTONE GRAHAM, a subject of the King of Great Britain, and resident of London, England, have invented certain new and useful improvements in and relating to methods and apparatus for automatically showing when tennis nets and the like are correctly adjusted in position, of which the following is a specification.

This invention relates to means for showing when tennis nets have been adjusted to the correct height and has for its object to provide such means which will operate automatically and which are yet of extremely simple and robust construction.

In general an indicator made according to the invention comprises two parts one which is inextensible being attached to the top of the net and the other being anchored in or standing upon the ground or other surface the two parts being interconnected in such a manner that when they move in relation to each other a suitable form of indicating mechanism carried by or attached to one or the other preferably the lower is caused to be operated.

In the simplest and preferred forms the part attached to the net comprises a coextensible strip of suitable material which may be doubled and come on each side of the net the lower end or ends of which strip are attached to one part of an indicating apparatus. The other part comprises a weight of suitable magnitude and shape or an anchor device or preferably the two combined which is adapted to be hooked to another part of the indicating device which is adapted to slide in definite relationship with the before mentioned part of the indicating device. The two parts of the indicating device by means of suitable slots and a pin or the like are adapted to cause a pointer to turn upon a suitable pivot, the position of the pointer with regard to the horizontal or vertical indicating to an observer if the net is at the correct height. Thus the dimension of the parts and their relative arrangement is preferably such that when the weight is resting upon the ground and the indicating pointer horizontal the net is at the correct height and should the pointer leave the horizontal during the progress of the game and move in one direction it would indicate that the net had slackened. When the pointer moves from the horizontal in the opposite direction for example when tightening up the net it indicates that the net is too high.

It will be seen that it is possible for a single individual to wind up or adjust the height of a tennis net or the like to its correct height without the necessity of taking anything in the nature of a measurement, by simply observing the pointer or other indicator, and further that with the net maintained at the correct height the tension of the usual top cord or cable and of the net remains substantially constant.

And in order that the invention may be better understood it will now be described with reference to the accompanying drawing, in which, Fig. 1 is a somewhat diagrammatic front elevation of the centre portion of a tennis net with my invention applied thereto.

Fig. 2 is an enlarged front elevation of one form of indicator and relative sliding parts.

Fig. 3 a side elevation and

Fig. 4 is a rear view of same.

Figs. 5 and 6 show similar views to Figs. 2 and 3 but of another form of the invention.

Figs. 7 and 8 show in side and front elevation a modified form of the invention.

Figures 9, 10, 11:
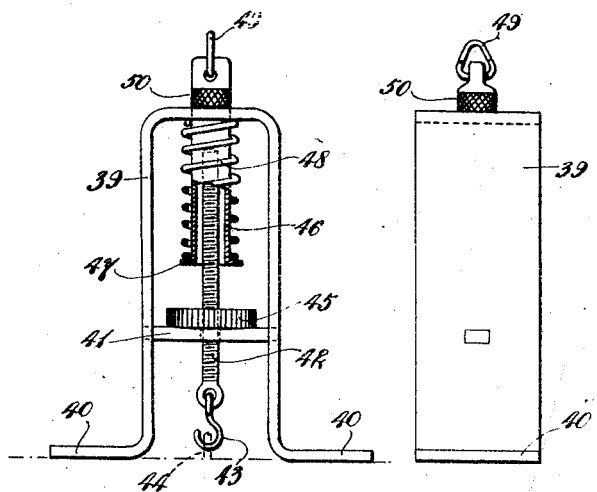
Fig. 9 shows in part sectional front elevation another method of carrying the invention into effect.
Fig. 10 is a side elevation of Fig. 9.
Fig. 11 is a side elevation of an inextensible centre tape or the like for use with certain forms of the invention particularly such as shown in Figs. 9 and 10.

Referring to Fig. 1, 9 shows a portion of a tennis net having a top tape or the like 10. 11 is a non-extensible strip which is doubled to extend on each side of the net. The lower ends have eyelets, loops, hooks or the like 12 and are brought together for the purpose hereafter described.

The strip 11 can be made from any suitable material for example it may be of waterproof fabric of suitable texture and of a desired number of plies or it may be of textile reinforced by metal wires or strips or again it may resemble the usual centre tape but carry on the inside a light metal chain adapted to be secured to the tape where it passes over the top of the net and to extend down on both sides of the net with the ends attached to the tape at or near its ends.

The eyelets, loops or the like 12 are attached to the movable member of a pair of sliding parts. These sliding parts may be strips, plates or any other desired mechanism which by their relative movements influence a suitable form of indicating device.

In the forms shown in Figs. 2, 3 and 4, 13 is a circular plate of sheet metal formed at the top with a bent over hook 14ª. This is adapted to engage with the loops or the like 12. The plate 13 carries on one surface two straps 14 in which is adapted to slide a strip 15 having a bent over stop 16 at its upper end. The lower end is bent into a hook 17 with which is adapted to engage a loop 18 attached to a comparatively heavy weight 19 which may be disc shaped and provided with a registering projection 20 to prevent accidental movement while the weight is on the ground.

In the form shown in Fig. 1 the weight 19 is provided with suitable staple like points or anchors 21 and if desired the weighted plate can be replaced by any form of anchor device helical or otherwise, or such anchor device can be combined with the weighted part. 22 is a pivot bolt at the centre of the plate 13 which passes through a slot in the strip 15. The strip 15 carries a projecting pin 24. 25 is a double ended pointer mounted freely to turn upon the pivot 22 and retained in position by a washer and split pin. One arm of the pointer 25 is formed with a slot 26 through which the pin 24 projects.

The lower portion of the plate 13 is formed with a cut away notch or recess 27 through which projects an eye bolt or rivet end 28 attached to the strip 15. The end of the pivot 22 coming on the back of the plate 13 is similarly formed with an eye and between the two eyes a somewhat Z shaped tension spring 29 is disposed. Any other suitable form of spring than that shown could be employed. It will be seen that the spring 29 tends to keep the bolt 28 at the upper end of the slot 27 that is it tends to keep the pointer 25 in the position shown in Fig. 2.

As in using the device the weight 19 rests upon the ground and consequently the sliding part 15 is prevented from moving, it follows that if the strip 11 engaged with the hook 14ª is pulled upwards to a sufficient degree it will raise the plate 13 which will slide with respect to the strip 15.

The pivot 22 moves upwards in the slot 23 and at the same time the slot 26 engaging with pin 24 fixed to the slide 15 causes the indicator 25 to be turned on its pivot 22 as the pin 24 is fixed.

The adjustment and dimensions of the parts is such that when the net is at the correct height and correctly strained, the indicating pointer 25 is horizontal and if the net becomes slack the spring 29 and the weight of the plate 13 causes the said plate to move downwards. This causes a reverse action to that previously described to take place and brings the pointer 25 into an angular position showing the observer or player that the net is not at the correct height. In tightening up the net, should it be brought too high the pointer 25 will assume an angular position but in the opposite direction.

The form of the invention shown in Figs. 5 and 6 resembles that shown in Figs. 2, 3, and 4 except that in this case the strip 15 is on one side of the plate 13 and the pointer 25 on the other. With this arrangement the pivot 22 is carried by the plate 13 and has mounted thereon between two washers 30, the pointer 25. The slide 15 carries the fixed pin 24 which passes through a vertical slot 31 in the plate 13 and projects into the slot 26 in the pointer. The action of this form of the device will be readily understood from the previous action and although no spring is shown between the relatively moving parts a spring of suitable type and disposition could be employed although in many cases the weight of the plate 13 could be such that the employment of a spring would not be necessary.

The form of the invention shown in Figs. 7 and 8 comprises a heavy casing 32 with suitable spring, weight or other gearing therein of such a nature that the hook 33 is kept pulled downwards. 34 is a spindle projecting from this casing carrying a bent pointer 35 which co-operates with markings or a scale on the quadrant shaped surface 36. The gearing in the casing is preferably such that when the hook 33 is pulled upwards in the direction of the arrow 37 the pointer 35 moves upwards in the direction of the arrow 38 and vice-versa.

In the form of the invention shown in Figs. 9 and 10 an inverted U shaped member 39 is provided having bent out lower ends or feet 40. 41 is a bridge piece fixed across the limbs of the U, which has a central clearance aperture through which passes the screwed stem of an eyebolt 42 carrying a hook 43 adapted to engage a fixed ground anchor such as indicated at 44. 45 is a milled nut on the bolt 42 by the adjustment of which the hook 43 is firmly engaged in the anchor 44 and the feet 40 at the same time pressed firmly on the ground surface.

46 is a tube sliding freely through a clearance aperture in the upper end of the member 39 and formed or provided with a flange 47 at its lower end. The upper end of the eyebolt 42 passes freely into the tube 46 without engaging therewith. 48 is a compression spring located between the flange 47 and the underside of the upper portion of the member 39. The upper end of the tube 46 is apertured to take a connecting ring or loop 49 for engagement with the lower end of an inextensible strip such for example as shown in Fig. 11 and hereafter referred to. The length of the inextensible strip or the like and the dimensions of the parts is such, that when the net is at the correct height a distinctly colored, shaped or otherwise formed or treated part of the surface of the tube 46, such as indicated at 50 comes just above the member 39 and constitutes the indicator. When this sinks the net is too low and when it rises the net is too high.

The inextensible strip shown in Fig. 11 comprises a chain 51 having a hook 52 at the top which passes over the top cord or cable of the net. A doubled centre tape 52$^a$ adapted to come on each side of the net comes on each side of the chain and the hook may be attached thereto if desired. At the lower end the chain passes through eyelets in the ends of the tape and carries a ring, loop, hook or the like by which it engages with the indicator or the like for instance with the ring or loop 49 Figs. 9 and 10.

Figure 12:
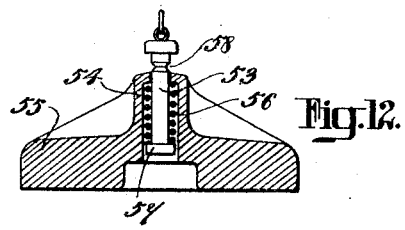
Fig. 12 is a sectional detail of a portion of another method of carrying the invention into effect.

A sliding stem 53 is shown in the form of the invention shown in Fig. 12 in a housing 54 at the upper part of a heavy weight 55 adapted to rest on the ground and having a compression spring 56 between a flange 57 on the stem and the upper part of the casing. A groove 58 is cut in the stem 53 and may be distinctly colored, and, when the net is at the correct height, just emerge as shown from out the housing 54, the upper end of the stem having means for engaging an inextensible strip or the like connected to the net.

Figure 13:
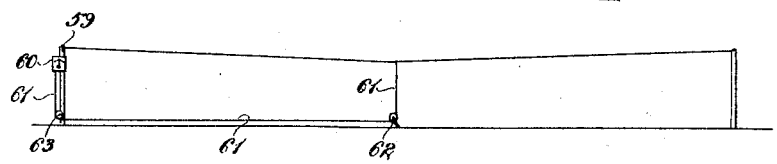
Fig. 13 is a diagrammatic view of a tennis net illustrating a further embodiment of the invention.

It will be seen that various means may be employed of operating the indicator or that the indicator may be placed in any convenient position other than the centre of the net, for instance as shown in Fig. 13 it might be placed on the winding up post 59, the indicator being shown at 60. In the arrangement shown an inextensible cable 61 is attached by one end to the centre of the net and passes down around an anchored or weighted pulley 62, thence to the base of the post 59, round a guide pulley 63 to the indicator 60. This indicator would comprise suitable spring controlled gearing keeping the cable 61 in tension and operating in a somewhat similar manner to the form shown in Figs. 7 and 8.

The invention is not limited to the forms described as it may be carried into effect in many other ways lying in the scope of the claims.

What I claim and desire to secure by Letters Patent in the United States of America is:—

1. Height indicating means for tennis nets and the like comprising two members, one arranged to be connected to the upper edge of net and the other arranged to be fixed in relation to the ground or other surface, interconnecting means between the two members, and indicating means, arranged to be operated by the relative movements of the two members.

2. Height indicating means for tennis nets and the like as claimed in claim 1 in which one of the members comprises an inextensible strip attached to one member of the indicator and the other member of which comprises an anchor suitably attached to another part of an indicating mechanism, the two members of the indicating mechanism being arranged to move in definite relationship with each other.

3. Height indicating means for tennis nets and the like as claimed in claim 1, in which the two members of the device are connected together by means of a spring.

4. Height indicating means for tennis nets and the like as claimed in claim 1, in which the said indicating means comprises a distinct feature of one of said members arranged to move in relation to the other member, by the variations in the height of the net.

5. Height indicating means for tennis nets and the like as claimed in claim 1, in which an inextensible strip is included between the net cord and one of said members.

6. Height indicating means for tennis nets and the like as claimed in claim 1, in which an inextensible strip is included between the net cord and one of said members, and includes a chain adapted to be hooked or otherwise attached to the net.

In witness whereof I affix my signature.

JOHN ELPHINSTONE GRAHAM.